US012152762B2

(12) United States Patent
Lin et al.

(10) Patent No.: US 12,152,762 B2
(45) Date of Patent: Nov. 26, 2024

(54) LIGHTING APPARATUS

(71) Applicant: LEEDARSON LIGHTING CO.,LTD., Fujian (CN)

(72) Inventors: Junjie Lin, Fujian (CN); Yongzhe Dong, Fujian (CN); Zhigang Song, Fujian (CN); Jiansheng Zhang, Fujian (CN); Qi Qin, Fujian (CN); Yibin Li, Fujian (CN); Tiansong Lan, Fujian (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 0 days.

(21) Appl. No.: 18/219,563

(22) Filed: Jul. 7, 2023

(65) Prior Publication Data

US 2024/0035644 A1 Feb. 1, 2024

(30) Foreign Application Priority Data

Jul. 29, 2022 (CN) ......................... 202221985773.6

(51) Int. Cl.

| | |
|---|---|
| ***F21V 19/00*** | (2006.01) |
| ***F21K 9/235*** | (2016.01) |
| ***F21K 9/237*** | (2016.01) |
| ***F21S 4/28*** | (2016.01) |
| ***F21V 15/01*** | (2006.01) |
| *F21Y 115/10* | (2016.01) |

(52) U.S. Cl.

CPC ............ *F21V 19/003* (2013.01); *F21K 9/235* (2016.08); *F21K 9/237* (2016.08); *F21S 4/28* (2016.01); *F21V 15/01* (2013.01); *F21Y 2115/10* (2016.08)

(58) Field of Classification Search

CPC ..... F21S 4/20; F21S 8/026; F21S 4/28; F21V 19/003; F21V 15/01

See application file for complete search history.

(56) References Cited

U.S. PATENT DOCUMENTS

2022/0039243 A1* 2/2022 Bocock ..................... F21S 4/28

* cited by examiner

*Primary Examiner* — Karabi Guharay
(74) *Attorney, Agent, or Firm* — Chun-Ming Shih; LANWAY IPR SERVICES

(57) ABSTRACT

A lighting apparatus includes a bottom housing, a light cover, multiple LED modules and a light source plate. The bottom housing includes a bottom plate. The bottom plate has a first film layer and a substrate layer. The first film layer has a width between 2 μm and 120 μm. The light source plate is mounted with the multiple LED modules on a top side of the light source plate. A bottom side of the light source plate faces to the bottom plate and the top side of the light source plate faces to the light cover. A light of the multiple LED modules pass through the light cover.

19 Claims, 9 Drawing Sheets

LIGHTING APPARATUS

FIELD

The present invention is related to a lighting apparatus, and more particularly related to a lighting apparatus with a flexible length.

BACKGROUND

LED (Light-Emitting Diode) technology has revolutionized the lighting industry by offering energy-efficient, long-lasting, and versatile lighting solutions. It has found extensive use in various light devices, including bulbs, downlights, panel lights, and spotlights.

LED bulbs are designed to replace traditional incandescent or compact fluorescent bulbs. They consist of an array of tiny, semiconducting diodes that emit light when an electrical current passes through them. LED bulbs are highly energy-efficient, consuming significantly less electricity than conventional bulbs while producing comparable or higher brightness. They have a long lifespan, often lasting tens of thousands of hours, which reduces the need for frequent bulb replacements. LED bulbs are available in a range of color temperatures, allowing users to choose between warm white, cool white, or daylight options to suit their preferences and lighting needs.

Downlights are recessed lighting fixtures commonly used for general or ambient lighting in residential, commercial, or hospitality settings. LED technology in downlights offers several advantages. LEDs can be arranged in an array within the fixture, providing uniform illumination across a space. They have a narrow beam angle, which enables focused lighting and accentuates specific areas or objects. LED downlights are highly efficient, delivering high lumens per watt and resulting in significant energy savings. Additionally, they have a long lifespan, reducing maintenance costs and downtime.

Panel lights are flat, thin lighting fixtures used for ambient lighting in offices, schools, hospitals, and other commercial spaces. LED panel lights utilize a grid of LEDs mounted on a flat surface, covered by a diffuser. The diffuser helps distribute the light evenly, eliminating glare and providing soft, uniform illumination. LED panels are highly energy-efficient and offer excellent color rendering, ensuring that objects and spaces appear vibrant and natural. They are available in different sizes and can be mounted on ceilings or suspended for a clean and modern lighting solution.

Spotlights, as the name suggests, are designed to provide focused illumination to highlight specific objects, artwork, or architectural features. LED spotlights offer precise control over the beam angle, allowing for adjustable and directional lighting. They are available in various beam spreads, such as narrow spot, medium flood, or wide flood, providing versatility in achieving desired lighting effects. LED spotlights are energy-efficient, generating less heat compared to traditional halogen spotlights. This makes them safer and reduces the risk of damage to sensitive objects.

A special type of light device that has gained popularity in recent years is the linear light, which is characterized by its elongated housing. Linear lights are fixtures that consist of a rectangular or cylindrical housing that houses a row or array of LED light sources.

The elongated design of linear lights makes them well-suited for various applications where long and continuous illumination is desired. They are commonly used for general lighting in commercial spaces, such as offices, retail stores, supermarkets, warehouses, and educational institutions. Linear lights can also be used for architectural lighting, accent lighting, task lighting, and even decorative purposes.

One of the key advantages of linear lights is their versatility. They are available in different lengths, ranging from a few inches to several feet, allowing for customization to fit specific lighting requirements. They can be surface-mounted, recessed, or suspended, providing flexibility in installation options.

Linear lights utilize LED technology, offering all the benefits associated with LEDs. They are energy-efficient, consuming less power compared to traditional fluorescent or incandescent lighting sources. LED linear lights provide excellent lumen output, ensuring bright and uniform illumination across the entire length of the fixture. They have a long lifespan, reducing maintenance and replacement costs. LED technology also enables precise control over color temperature, allowing users to choose between warm white, cool white, or daylight options.

Linear lights are often designed with features that enhance their performance and functionality. Some models incorporate dimming capabilities, allowing users to adjust the light output according to their needs and preferences. Others may have built-in sensors for occupancy detection or daylight harvesting, contributing to energy savings by automatically adjusting the light output based on the surrounding conditions.

In terms of aesthetics, linear lights offer a sleek and modern appearance. The elongated form factor creates a clean and streamlined look, which complements contemporary architectural designs. Linear lights are available in various finishes and materials, including aluminum, stainless steel, or plastic, allowing for integration into different interior or exterior settings.

Overall, linear lights with their elongated housing are a versatile lighting solution suitable for a wide range of applications. They combine the benefits of LED technology, energy efficiency, long lifespan, and customization options, making them a popular choice for commercial and architectural lighting projects.

However, to manufacture different lengths of linear light devices, it takes manufacturer to prepare different sizes of manufacturing tools, thus making the manufacturing cost and stocking cost difficult to low down and reduces flexibility.

Therefore, it is beneficial to develop a better way to manufacture components of linear light devices.

SUMMARY

A lighting apparatus includes a bottom housing, a light cover, multiple LED modules and a light source plate.

The bottom housing includes a bottom plate.

The bottom plate has a first film layer and a substrate layer.

The first film layer has a width between 2 μm and 120 μm.

The light source plate is mounted with the multiple LED modules on a top side of the light source plate.

A bottom side of the light source plate faces to the bottom plate and the top side of the light source plate faces to the light cover.

A light of the multiple LED modules pass through the light cover.

In some embodiments, the bottom plate further has a second film layer.

The first film layer and the second film layer are attached on two sides of the substrate layer.

In some embodiments, there is a first glue layer between the first film layer and the substrate layer.

There is a second glue layer between the second film layer and the substrate layer.

In some embodiments, the substrate layer has a metal layer.

In some embodiments, substrate layer also has a wiring layer with contact nodes for guiding electrical signal through the wiring layer.

In some embodiments, an first antenna layer is attached to the bottom housing.

In some embodiments, the first antenna layer is between the substrate layer and the first film layer.

There is a second antenna layer attached between the substrate layer and the second film layer.

The first antenna layer and the second layer receive wireless commands from an external device.

A controller decodes the wireless command and adjusts driving currents to the multiple LED modules to obtain a required light parameter.

In some embodiments, there is a thermal passing unit for guiding heat of the multiple LED modules to the bottom housing.

In some embodiments, a portion of the first film for contacting the thermal passing unit is removed for the thermal passing unit directly contact the substrate layer without passing heat via the first film to the substrate layer.

In some embodiments, the first glue layer covers 60% to 95% of an interface area between the first film layer and the substrate layer.

In some embodiments, there are protective layers on the first film layer and the second film layer.

In some embodiments, the first film layer has a first thickness, the second film layer has a second thickness.

The first thickness is smaller than the second thickness for 5% of the second thickness.

In some embodiments, the first film layer has a first thickness, the second film layer has a second thickness.

The second thickness is smaller than the first thickness for 5% of the first thickness.

In some embodiments, the first film layer and the second film layer are plastic layers.

In some embodiments, the plastic layers are made of PE or PP material.

In some embodiments, the bottom housing has two lateral wall.

The bottom plate is a rectangular shape.

In some embodiments, there are two side covers disposed on two opposite ends of the bottom housing.

In some embodiments, there is a wiring layer for passing electric signal from one cover to the other cover for connecting another lighting apparatus.

Said another lighting apparatus and the lighting apparatus are connected in parallel.

In some embodiments, there are multiple cutting segment structures on the bottom housing for changing the bottom housing to fit different lengths.

In some embodiments, the cutting segment structures are provided to break off to change the length of the bottom housing.

DETAILED DESCRIPTION

Figure 4:
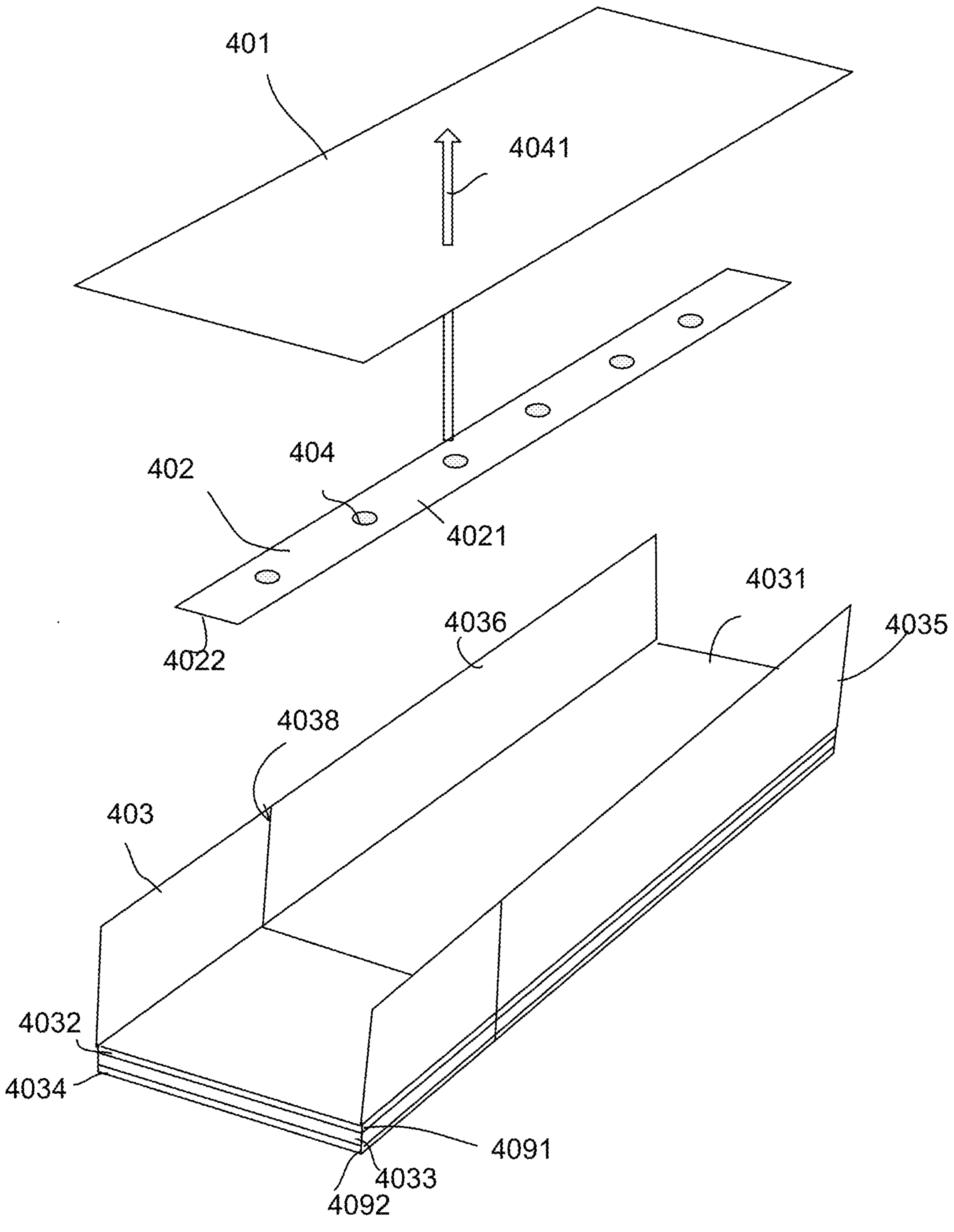
FIG. 4 illustrates an exploded view of a lighting apparatus.

Please refer to FIG. 4, which is an exploded view of a lighting apparatus. A lighting apparatus includes a bottom housing 403, a light cover 401, multiple LED modules 404 and a light source plate 402.

The bottom housing 403 includes a bottom plate 4031.

The bottom plate 4031 has a first film layer 4032 and a substrate layer 4033.

The first film layer 4032 has a width between 2 μm and 120 μm. In some embodiments, when the substrate layer 4033 is a metal layer, the width range is important. If the substrate layer 4033 is too large, the overall cost may be too high and may decrease heat dissipation effect.

In some embodiments, the thickness ratio between the film layer 4032 and the substrate layer 4033 is between 0.5% to 20%.

The light source plate 402 is mounted with the multiple LED modules 404 on a top side 4021 of the light source plate 402.

A bottom side 4022 of the light source plate 402 faces to the bottom plate 4031 and the top side 4021 of the light source plate 402 faces to the light cover 401.

A light 4041 of the multiple LED modules 404 pass through the light cover 401.

In some embodiments, a light cover 401 may contain multiple lenses corresponding to different LED modules. These lenses may be used for diffusing light of the LED modules to soften the light and enhance output light pattern.

In some embodiments, the bottom plate 4031 further has a second film layer 4034.

The first film layer 4032 and the second film layer 4034 are attached on two sides of the substrate layer 4033.

In some embodiments, there is a first glue layer between the first film layer and the substrate layer.

Figure 3:
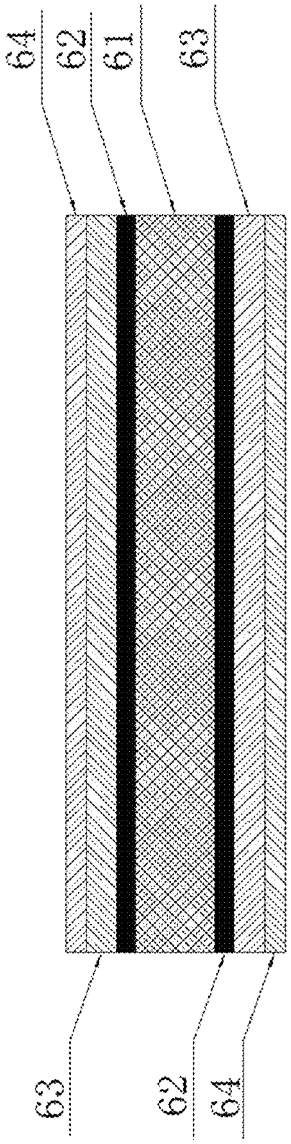
FIG. 3 illustrates a layer structure example of a bottom plate.

FIG. 3 shows a side view illustrating multiple layers in a bottom plate example.

The bottom plate includes a substrate layer 61. Two glue layers 62 are applied to attach the film layers 63 like the first film layer and the second film layer to the substrate layer 61. Protective layers 64 are attached to protect the film layers 63.

There is a second glue layer between the second film layer and the substrate layer. Please refer to FIG. 4, which shows the position relation between the substrate layer 4033 and the second film layer 4034. The second glue layer, not particularly illustrated, is placed between the substrate layer 4033 and the second film layer 403.

In some embodiments, the substrate layer has a metal layer. For example, the substrate layer may be a galvanized steel plate, cold rolled steel plate, aluminum plate, titanium zinc plate.

The bottom housing 40 has two lateral walls 4035, 4036. In a manufacturing process, the bottom housing may be manufactured as a one-piece plate by bending the component to form the two lateral walls 4035, 4036 and the bottom plate 4031.

In addition, the one-piece plate may be cut from an even larger plate. In such way, the length of the bottom housing can be easily adjusted. For example, linear light devices with 12 cm, 15 cm, 18 cm, 20 cm, 24 cm, 30 cm or any size can be easily produced, just to control the positions to cut a large one-piece plate.

In addition, the one-piece plate may be made via roll forming. By sending the substrate layer like a steal plate into a roll forming machine, glue are applied to the substrate layer and the machine is used for attaching the film layer to the substrate layer. A proper length of the bottom housing is then determined and a larger plate is cut to necessary bottom plate size.

Roll forming is a manufacturing process used to shape metal into long, continuous profiles with a consistent cross-section. It involves passing a strip of metal through a series of rollers or roll stands, each of which performs a specific bending or forming operation on the metal.

The process starts with an uncoiled strip of metal, typically steel, that is fed into the first set of rollers. These rollers are designed to gradually bend or form the metal into the desired shape. As the metal passes through subsequent sets of rollers, each set adds further shaping and contouring to the profile.

The rollers in a roll forming machine are typically arranged in a sequence that matches the desired final shape of the profile. The rolls themselves are precision-engineered to achieve specific bending or forming actions on the metal strip. The process can incorporate various operations such as bending, punching, notching, embossing, or cutting to create a wide range of profiles.

Roll forming offers several advantages over other metal forming processes. It is a continuous process, which means that long lengths of profile can be produced efficiently and quickly. The process is highly precise and produces profiles with consistent dimensions and high repeatability. Roll forming is also flexible, allowing for the creation of complex profiles with various shapes and sizes.

The products created through roll forming find applications in many industries, including construction, automotive, aerospace, appliance manufacturing, and others. Some common examples of roll-formed products include metal roofing and wall panels, window frames, door frames, gutters, automotive components, shelving systems, and electrical enclosures.

Overall, roll forming is a versatile and efficient metal forming process that enables the mass production of complex profiles with high precision and consistency.

The bottom housing may be made via roll forming or stamp forming. The roll forming is preferred in some embodiments.

Roll forming and stamp forming are both metal forming processes but differ in their approach and the types of products they produce.

Roll forming, as explained earlier, involves passing a continuous strip of metal through a series of rollers to gradually shape it into a desired profile. It is a continuous process that is well-suited for producing long lengths of consistent profiles with complex shapes. Roll forming is commonly used for manufacturing products like metal roofing, wall panels, window frames, and automotive components.

Stamp forming, on the other hand, involves the use of a press and a die to shape metal sheets or blanks into the desired form. The die contains a cavity with the negative shape of the final product, and the metal sheet is placed between the die and a punch. When the press applies pressure, the punch forces the metal into the die, creating the desired shape. Stamp forming is a discrete process, meaning that each sheet or blank is formed individually.

Stamp forming is often used for producing parts with more intricate and three-dimensional shapes, such as automotive body panels, appliance parts, and intricate brackets. It is particularly effective for producing components that require complex bends, sharp angles, or embossing.

The main differences between roll forming and stamp forming can be summarized as follows:

Continuous vs. Discrete Process: Roll forming is a continuous process that produces long lengths of profiles, while stamp forming is a discrete process that forms individual sheets or blanks.

Profile Complexity: Roll forming is suitable for producing profiles with continuous shapes and gradual bends, while stamp forming is better suited for complex, three-dimensional shapes with sharp angles and embossing.

Production Volume: Roll forming is highly efficient for mass production of long profiles, while stamp forming is often used for lower to medium production volumes.

Material Thickness: Roll forming is commonly used for thinner gauge materials, such as steel coils, while stamp forming can handle a wider range of material thicknesses.

In summary, roll forming and stamp forming are both valuable metal forming processes, each with its strengths and applications. The choice between the two depends on factors such as the desired product shape, complexity, production volume, and material thickness.

Polypropylene (PE), polyethylene (PP) or other plastic or non-plastic material may be chosen to form the film layer. Polypropylene and polyethylene because under experiments, they show nice structure strength, appearance and protective function.

In some embodiments, the substrate layer also has a wiring layer with contact nodes for guiding electrical signal through the wiring layer.

Figure 6:
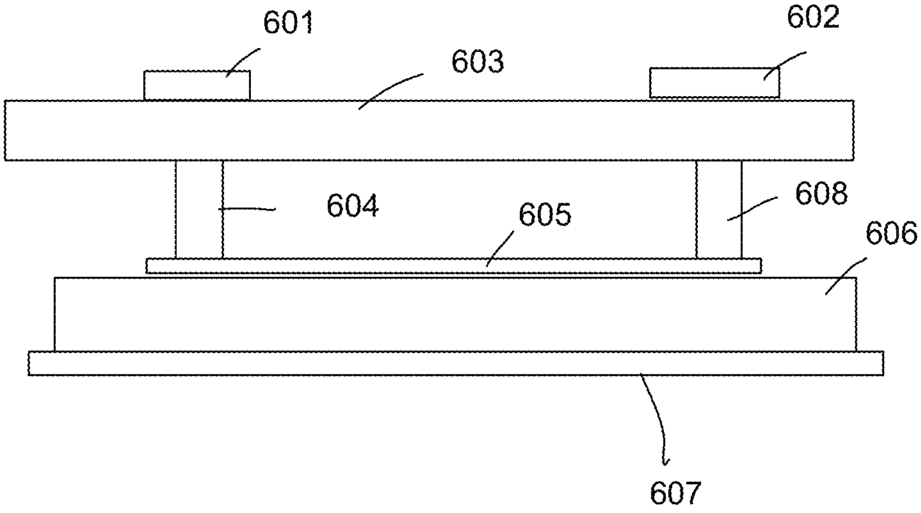
FIG. 6 shows an example.

FIG. 6 shows such an example. In FIG. 6, there is wiring layer 605 with wires for connecting two metal columns 604, 608. The LED module 601 or other electronic component mounted on a light source plate 603 is connected to the LED module 602 or other electronic component via the conductive formed by the wires of the wiring layer 605, the metal columns 604, 608.

Figure 7:
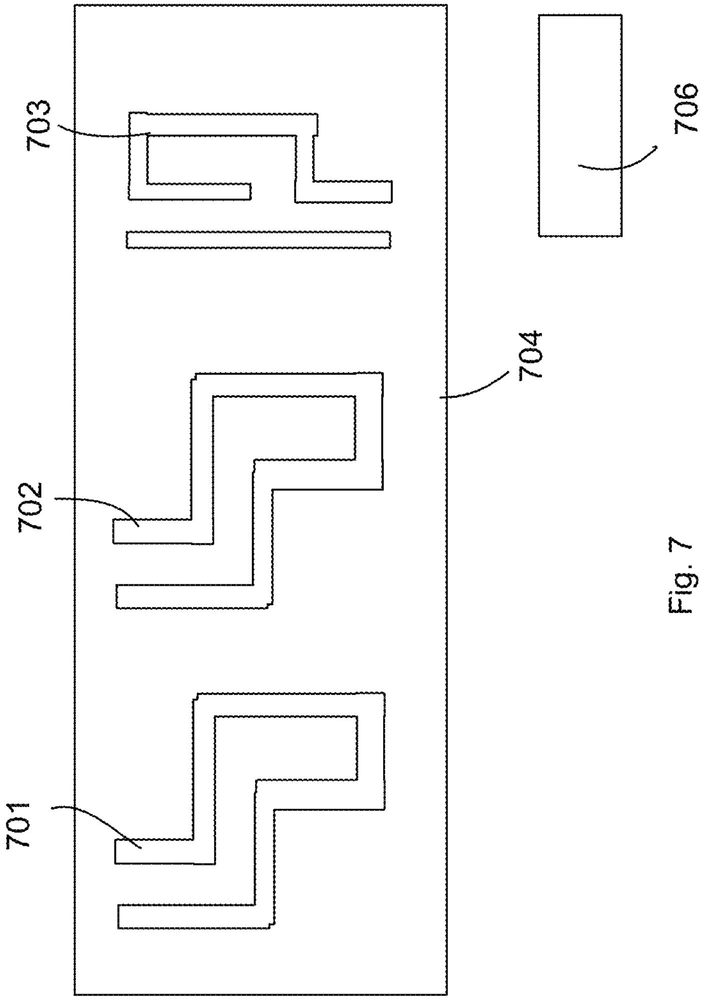
FIG. 7 shows a first antenna layer.

In FIG. 7, a first antenna layer that includes three antennas 701, 702, 703 is attached to the bottom housing 704, e.g. being attached to the substrate layer or film layer mentioned above.

In some embodiments, the first antenna layer is between the substrate layer and the first film layer.

There is a second antenna layer attached between the substrate layer and the second film layer.

The first antenna layer and the second layer receive wireless commands from an external device 706 as illustrated in FIG. 7.

Figure 1:
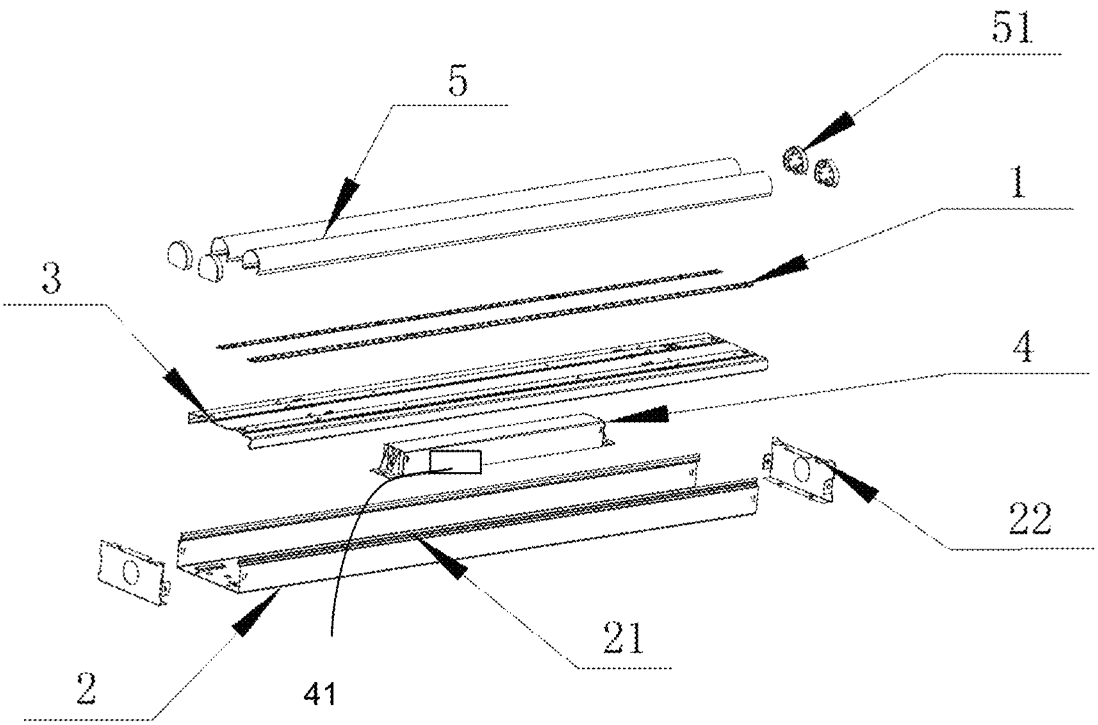
FIG. 1 illustrates an exploded view of a lighting apparatus embodiment.

In FIG. 1, there is a driver box 4 containing a power circuit for converting an indoor power like 110V AC to driving currents to LED modules on the light source 1. In addition, the driver box 4 may include a controller 41, that may be control circuits, processors or other circuits that implement control function like generating control signals to power circuit or PWM signals to change driving currents with help of PWM control power circuit.

The controller 41 decodes the wireless command and adjusts driving currents to the multiple LED modules on the light source 1 to obtain a required light parameter.

For example, there are different types of LED modules emitting lights with different color temperatures. By changing light intensity ratio or turn-on ratio, the mixed color temperature, which is a type of light parameter may be obtained.

In some embodiments, there is a thermal passing unit for guiding heat of the multiple LED modules to the bottom housing.

Figure 8:
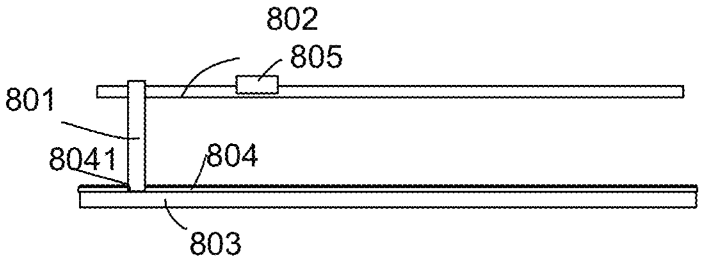
FIG. 8 shows an LED module and a thermal path.

In FIG. 8, heat of LED module 805 is transmitted by a first thermal path 802, then the second thermal path 801 to the substrate layer 803. The first thermal path 802 and the second thermal path 801 form an example of a thermal passing unit, which may be made of metal mate In some embodiments, a portion 8041 of the first film 804 for contacting the thermal passing unit is removed for the thermal passing unit directly contact the substrate layer 803 without passing heat via the first film layer 804 to the substrate layer 803.

In some embodiments, the first glue layer covers 60% to 95% of an interface area between the first film layer and the substrate layer.

Figure 9:
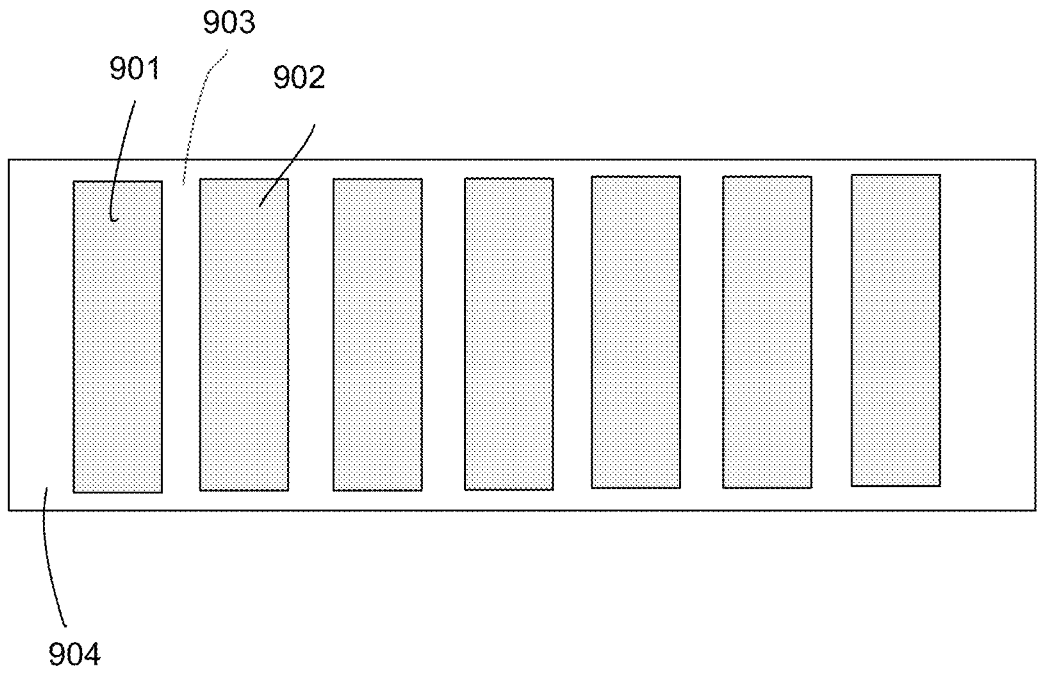
FIG. 9 shows a glue layer.

FIG. 9 shows the glue layer is composed of multiple discontinued areas 901, 902 with spacing 903. The discontinued areas 901, 902 of the glue layers covers less than 95% of the interface area between the first film layer and the substrate layer 904.

Such design prevents problem caused by thermal expansion and/or other factors.

In some embodiments, there are protective layers on the first film layer and the second film layer.

In FIG. 4, the first film layer has a first thickness 4091, the second film layer has a second thickness 4092. The first thickness 4091 and the second thickness 4092 are measured by a lateral side of the first film layer 4032 and the second film layer 4032.

The first thickness is smaller than the second thickness for 5% of the second thickness. In some embodiments, this is important because a larger exterior thickness prevent hurting users if the exterior side is too hot.

In some embodiments, the first film layer has a first thickness, the second film layer has a second thickness.

The second thickness is smaller than the first thickness for 5% of the first thickness.

Such design is preferred in some embodiments that need more heat dissipation effect, e.g. in light device with larger LED power device. With a smaller first film layer thickness, heat is easier passes through the metal substrate layer. With a less thickness exterior layer, heat is easy to be passed to outside environment.

In some embodiments, the first film layer and the second film layer are plastic layers.

In some embodiments, the plastic layers are made of PE or PP material.

In some embodiments, the bottom housing has two lateral wall.

The bottom plate is a rectangular shape.

In some embodiments, there are two side covers disposed on two opposite ends of the bottom housing.

In the example of FIG. 1, there are two side covers 22 for concealing two opposite sides of the lighting apparatus.

Figure 5:
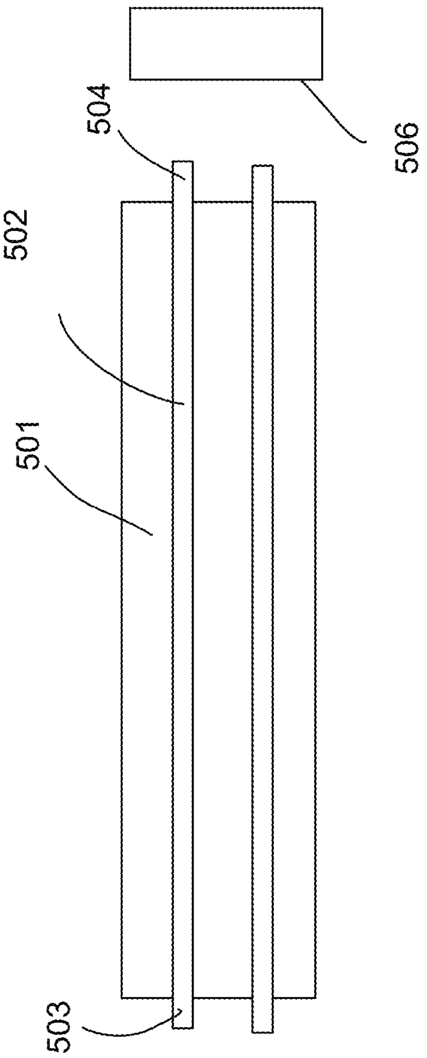
FIG. 5 illustrates a wiring layer with a wire for passing electrical signal.

In FIG. 5, there is a wiring layer 501 with a wire 502 for passing electric signal from one cover, the first end 503 of the wire 501, to the other cover, the other end 504 of the wire 501 for connecting another lighting apparatus 506.

The another lighting apparatus 506 may have the same structure as the lighting apparatus mentioned above.

Said another lighting apparatus 506 and the lighting apparatus are connected in parallel via such wires.

Specifically, the lighting apparatus may have a driver but the wires mentioned above are routing bypassing the driver, e.g. to be attached on substrate layer so as to route external power from a cover of the lighting apparatus to said another lighting apparatus without entering the components like LED modules or the driver of the lighting apparatus. That makes the connection of the two lighting apparatuses as parallel.

Such connection is simple and does not propagate error from one lighting apparatus to another lighting apparatus.

In some embodiments, there are multiple cutting segment structures 4038 on the bottom housing 4031 for changing the bottom housing 4031 to fit different lengths.

In some embodiments, the cutting segment structures are provided to break off to change the length of the bottom housing. For example, precutting grooves for easier to break off may be used as the cutting segment structures. Users may change the size of the lighting apparatus easily to fit the lighting apparatus to the required size of the installation environment.

Such features are important when fitting light size to an installation space.

Figure 2:
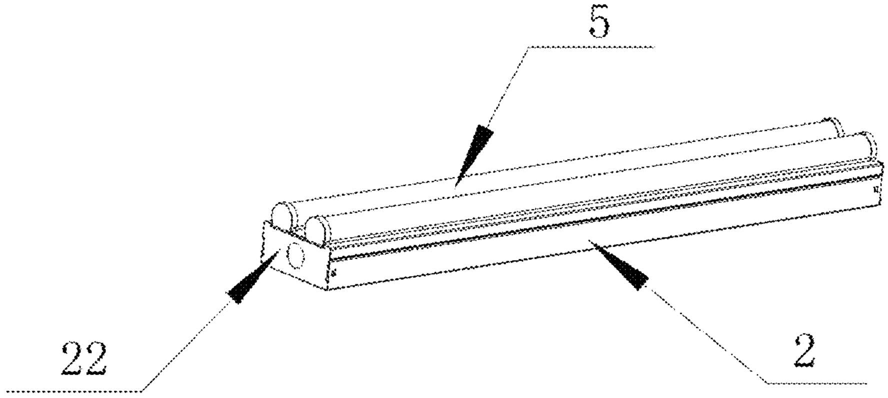
FIG. 2 illustrates the lighting apparatus embodiment being assembled.

Please refer to FIG. 1 and FIG. 2, which illustrate a lighting apparatus embodiment.

FIG. 1 is an exploded view while FIG. 2 illustrates how the components are assembled.

The lighting apparatus has two end covers 51 fixed on two sides of a light cover 5. There is a light source plate 3 for mounting two LED light strips 1. There is a driver 4 attached on a bottom housing 2. Two side covers 22 are attached to two opposite ends of the bottom housing 21. The bottom housing 2 has two lateral walls 21.

FIG. 2 show the bottom housing 2, the light cover and the side covers 22.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a bottom housing, wherein the bottom housing comprises a bottom plate, wherein the bottom plate has a first film layer and a substrate layer, wherein the first film layer has a width between 2 μm and 120 μm;

a light cover;

multiple LED modules; and a light source plate mounted with the multiple LED modules on a top side of the light source plate, wherein a bottom side of the light source plate faces to the bottom plate and the top side of the light source plate faces to the light cover, wherein a light of the multiple LED modules pass through the light cover, wherein the bottom plate further has a second film layer, wherein the first film layer and the second film layer are attached on two sides of the substrate layer.

2. The lighting apparatus of claim 1, wherein there is a first glue layer between the first film layer and the substrate layer, wherein there is a second glue layer between the second film layer and the substrate layer.

3. The lighting apparatus of claim 2, wherein the substrate layer has a metal layer.

4. The lighting apparatus of claim 3, wherein the substrate layer also has a wiring layer with contact nodes for guiding electrical signal through the wiring layer.

5. The lighting apparatus of claim 3, wherein a first antenna layer is attached to the bottom housing.

6. The lighting apparatus of claim 5, wherein the first antenna layer is between the substrate layer and the first film layer, wherein there is a second antenna layer attached between the substrate layer and the second film layer, wherein the first antenna layer and the second layer receive wireless commands from an external device, wherein a controller decodes the wireless command and adjusts driving currents to the multiple LED modules to obtain a required light parameter.

7. The lighting apparatus of claim 3, wherein there is a thermal passing unit for guiding heat of the multiple LED modules to the bottom housing.

8. The lighting apparatus of claim 7, wherein a portion of the first film for contacting the thermal passing unit is removed for the thermal passing unit directly contact the substrate layer without passing heat via the first film to the substrate layer.

9. The lighting apparatus of claim 2, wherein the first glue layer covers 60% to 95% of an interface area between the first film layer and the substrate layer.

10. The lighting apparatus of claim 1, wherein there are protective layers on the first film layer and the second film layer.

11. The lighting apparatus of claim 1, wherein the first film layer has a first thickness, the second film layer has a second thickness, wherein the first thickness is smaller than the second thickness for 5% of the second thickness.

12. The lighting apparatus of claim 1, wherein the first film layer has a first thickness, the second film layer has a second thickness, wherein the second thickness is smaller than the first thickness for 5% of the first thickness.

13. The lighting apparatus of claim 1, wherein the first film layer and the second film layer are plastic layers.

14. The lighting apparatus of claim 13, wherein the plastic layers are made of PE or PP material.

15. The lighting apparatus of claim 1, wherein the bottom housing has two lateral wall, wherein the bottom plate is a rectangular shape.

16. The lighting apparatus of claim 15, wherein there are two side covers disposed on two opposite ends of the bottom housing.

17. The lighting apparatus of claim 16, wherein there is a wiring layer for passing electric signal from one cover to the other cover for connecting another lighting apparatus, wherein said another lighting apparatus and the lighting apparatus are connected in parallel.

18. The lighting apparatus of claim 15, wherein there are multiple cutting segment structures on the bottom housing for changing the bottom housing to fit different lengths.

19. The lighting apparatus of claim 18, wherein the cutting segment structures are provided to break off to change the length of the bottom housing.

* * * * *